Aug. 19, 1969  N. T. SHELTON ET AL  3,461,932
PROCESS FOR MANUFACTURING A CONTINUOUS VENEER STRIP
Filed July 31, 1967  17 Sheets-Sheet 14

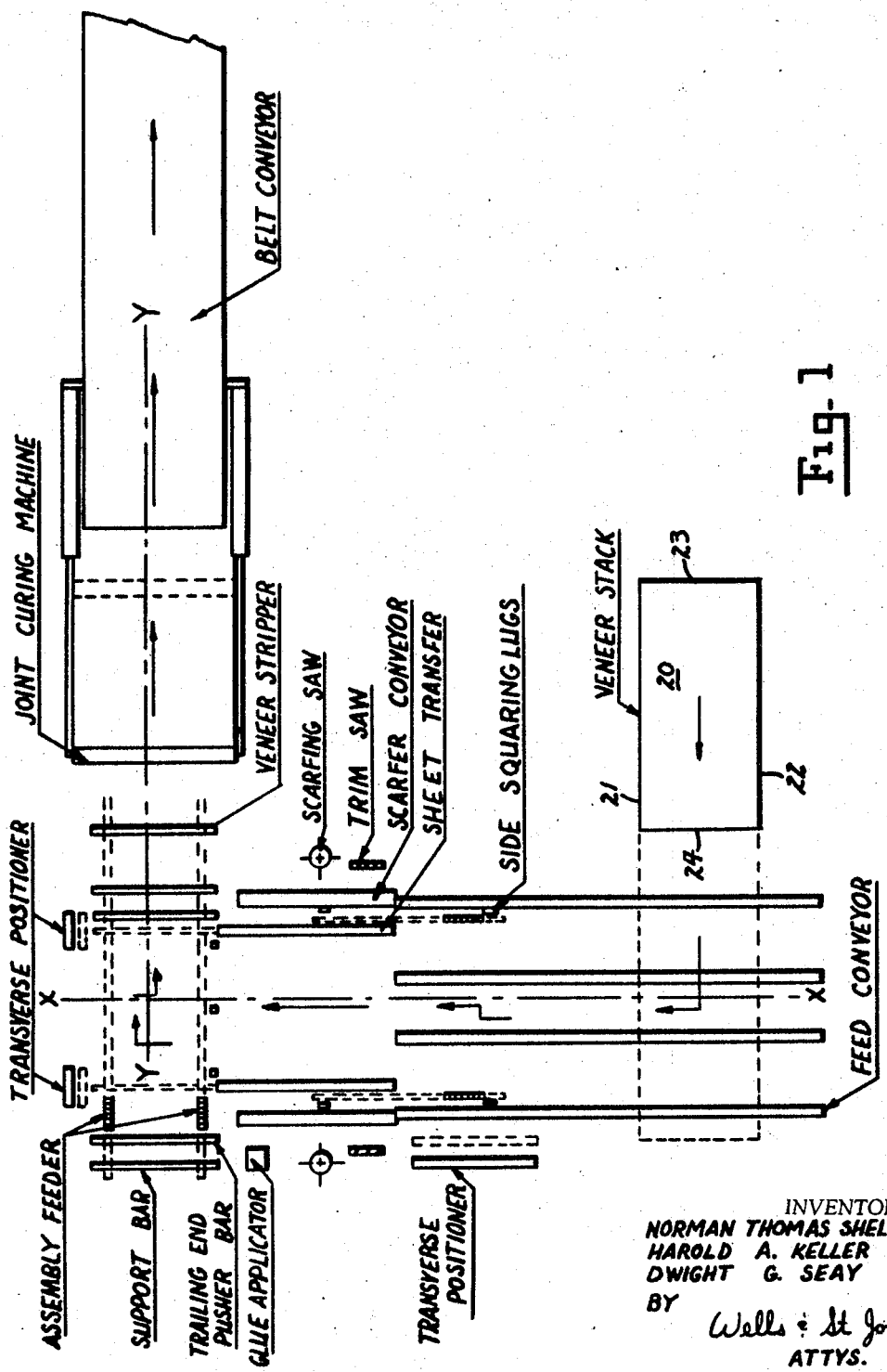

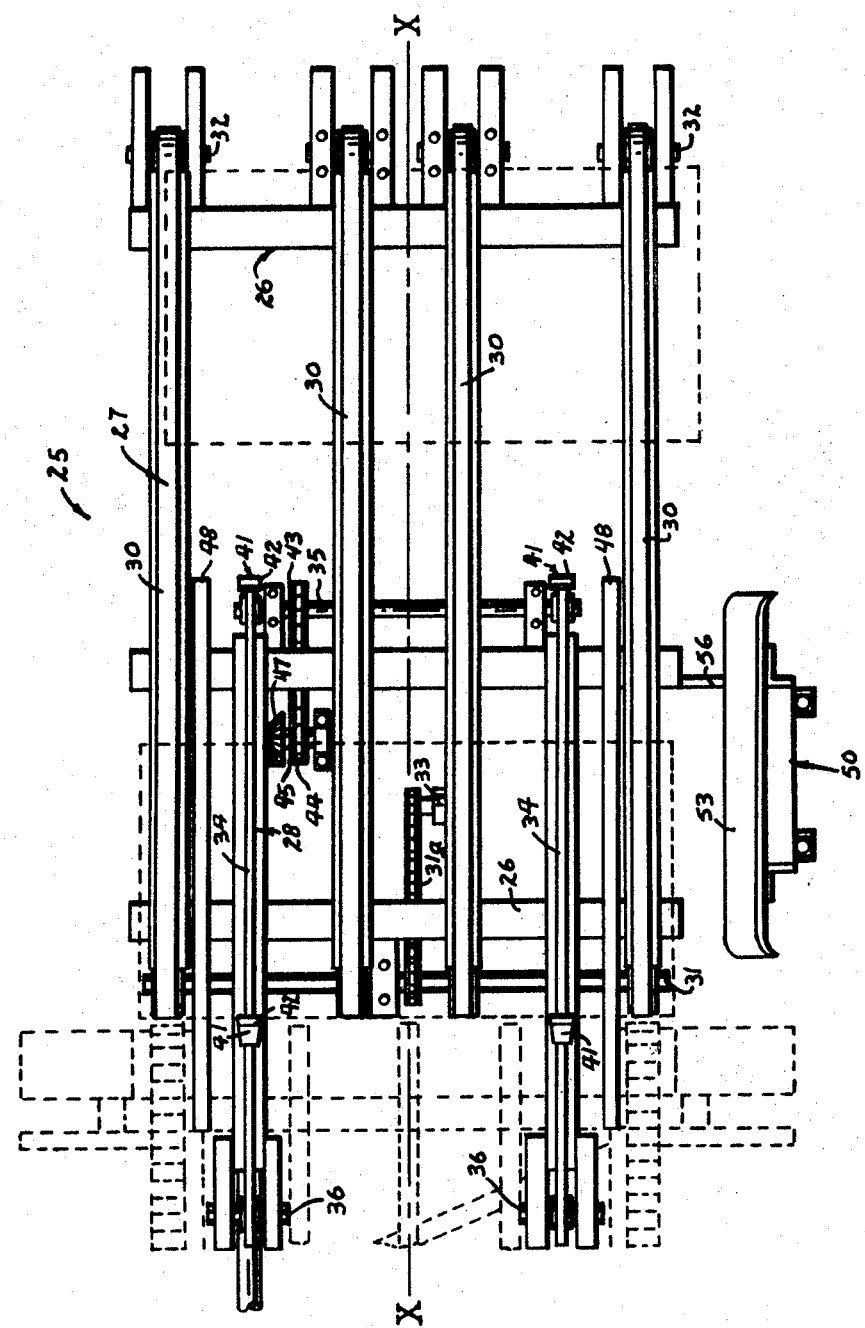

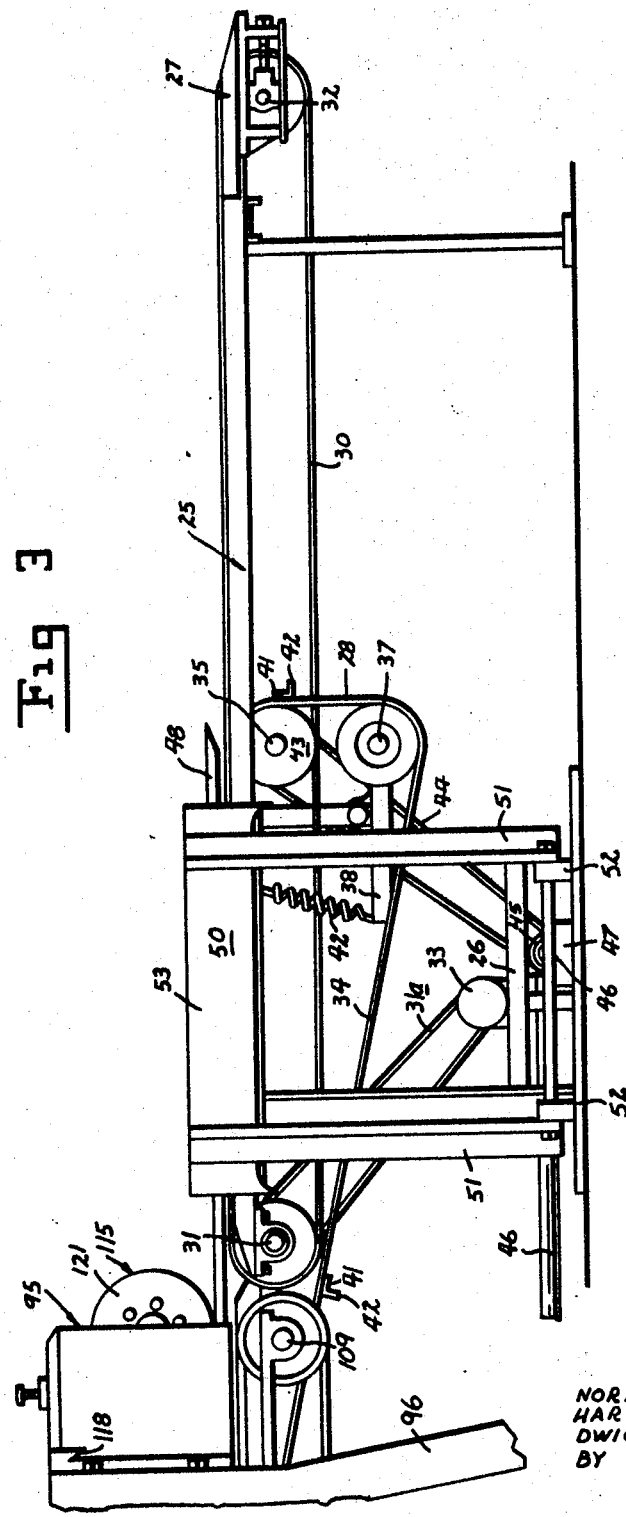

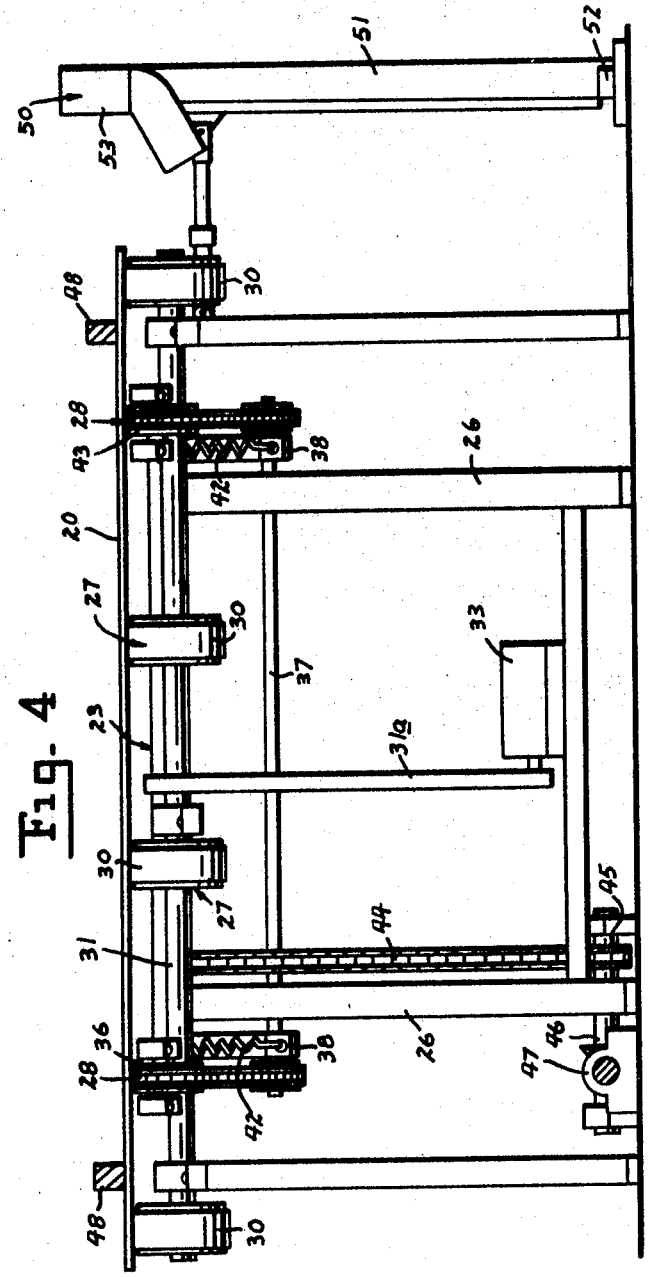

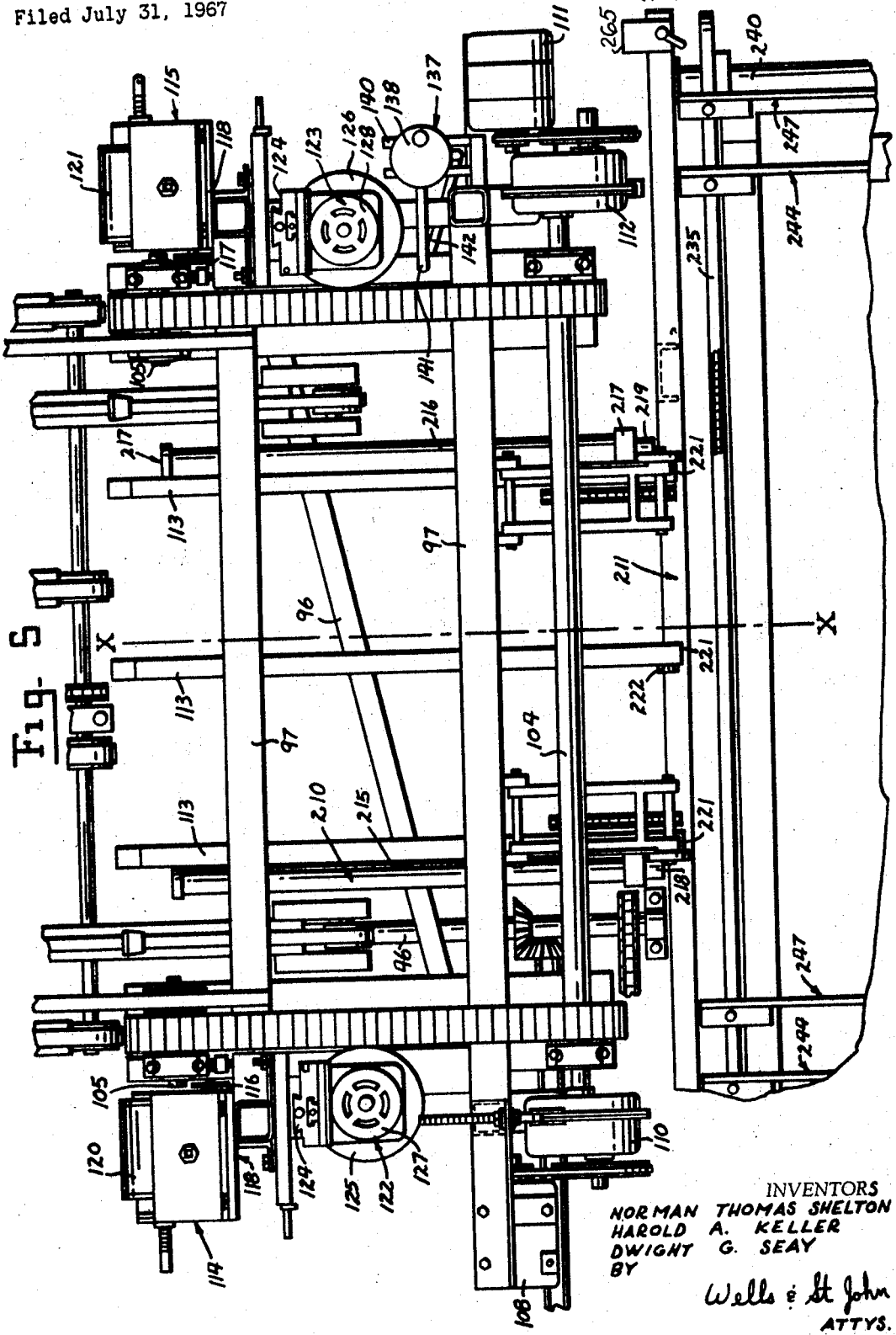

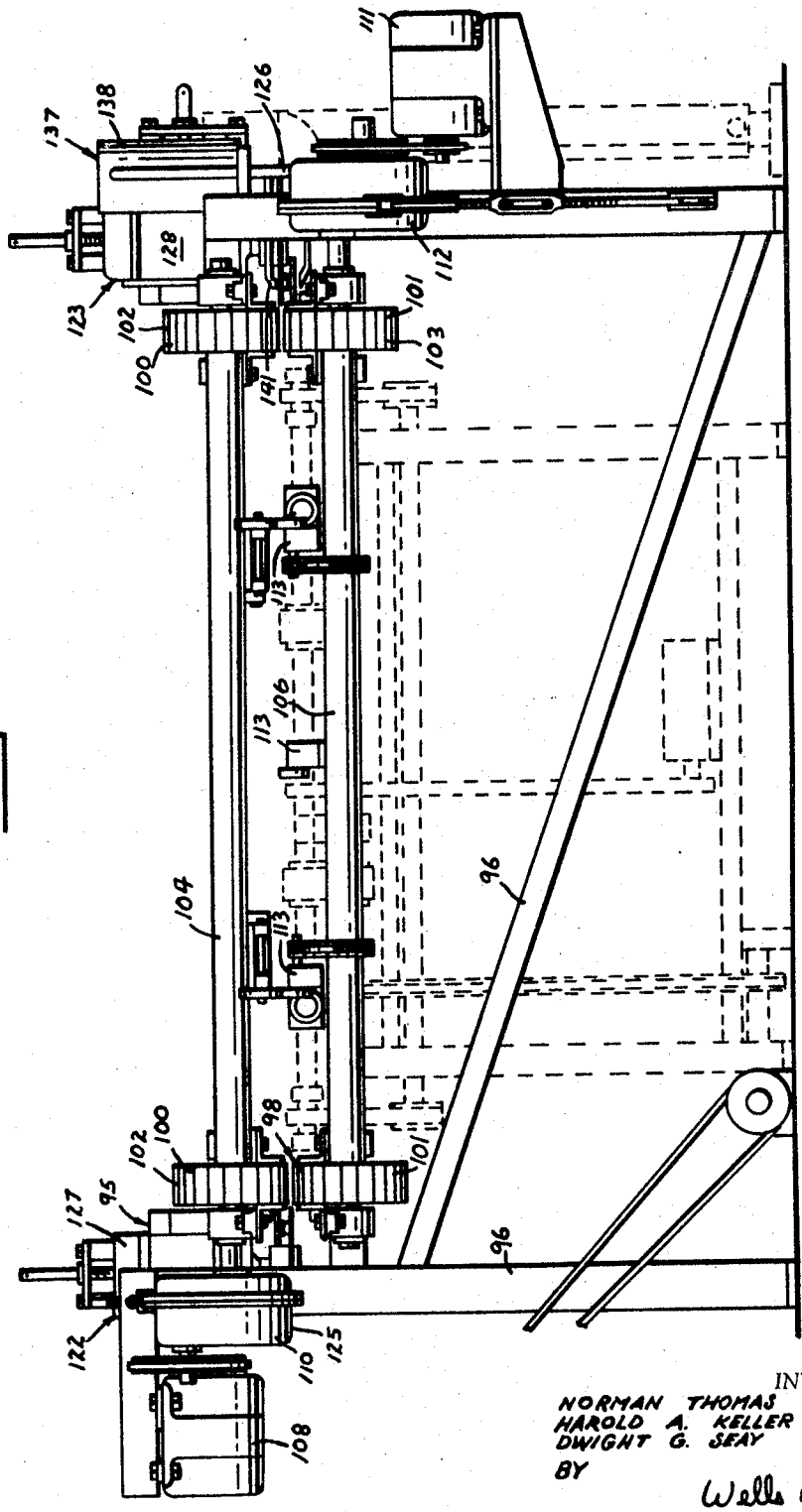

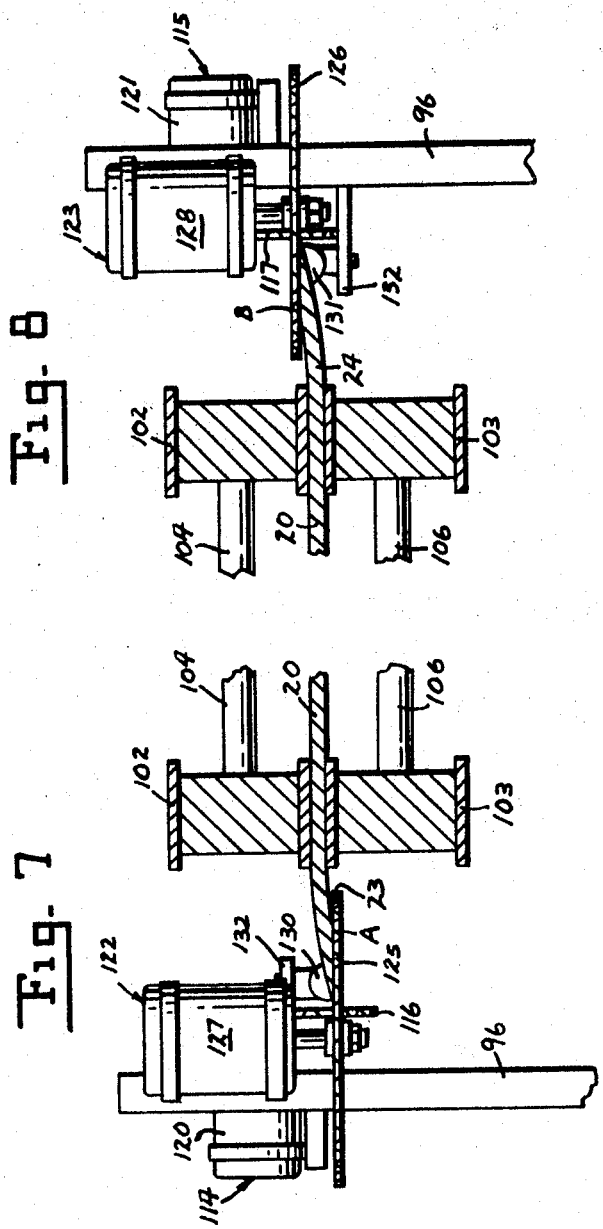

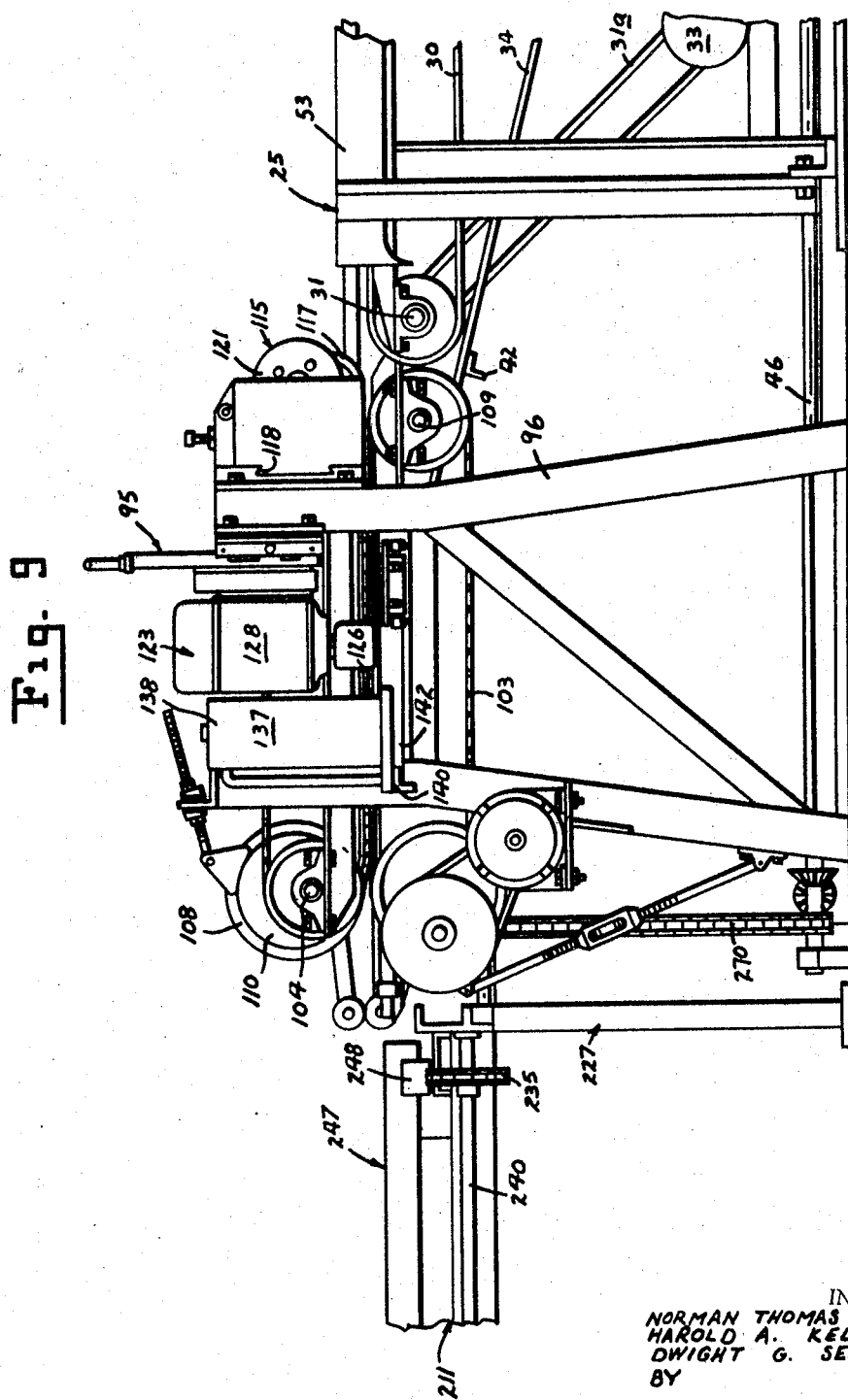

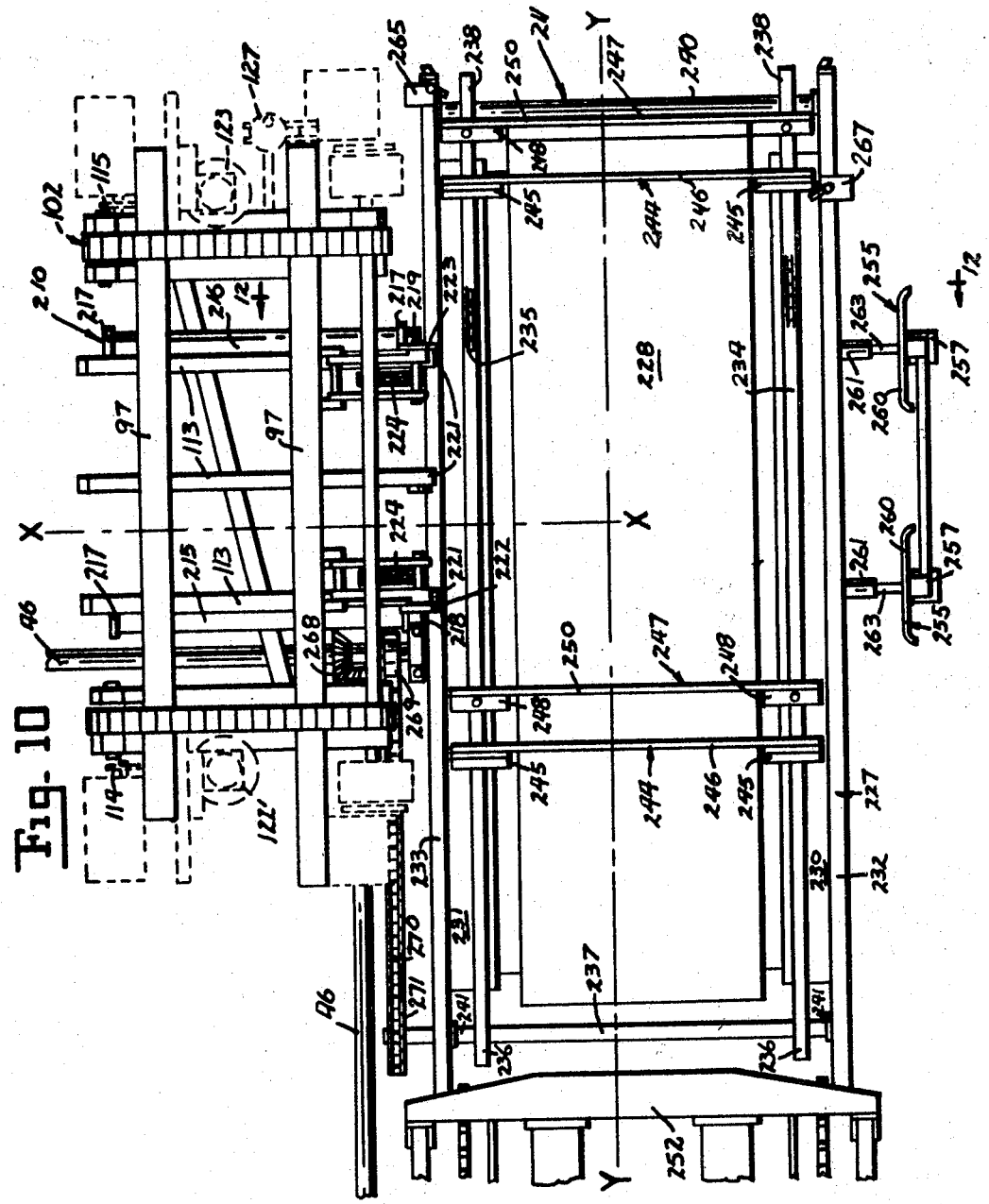

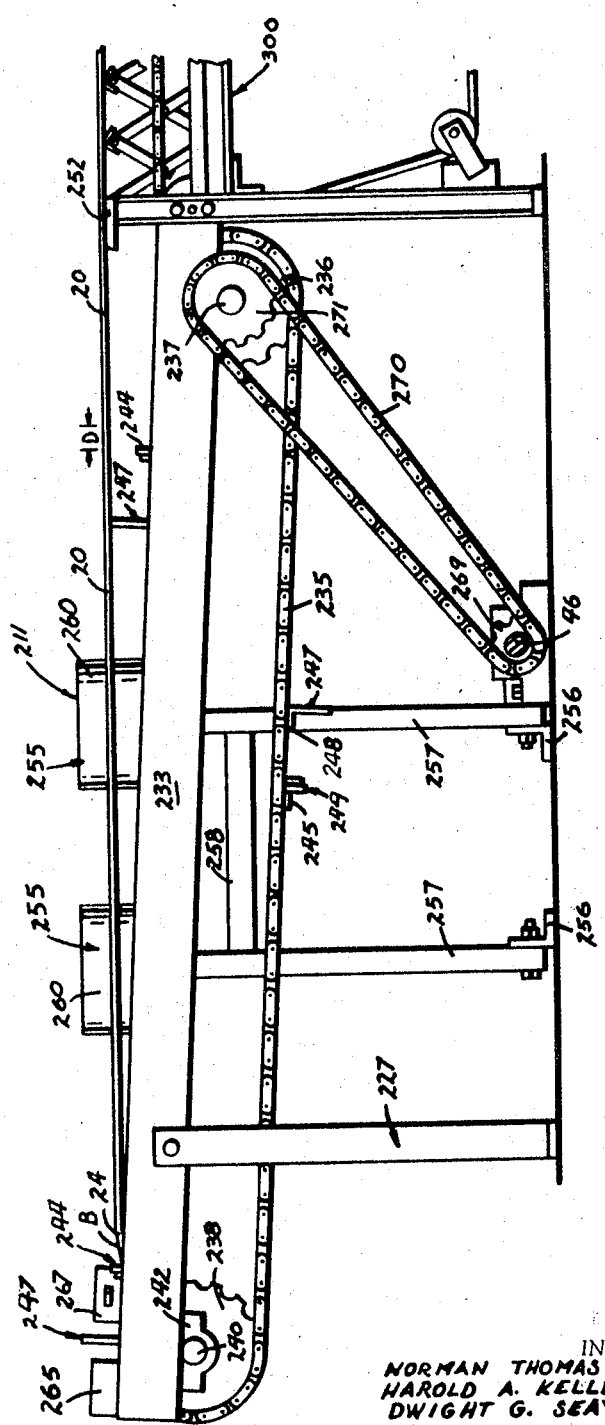

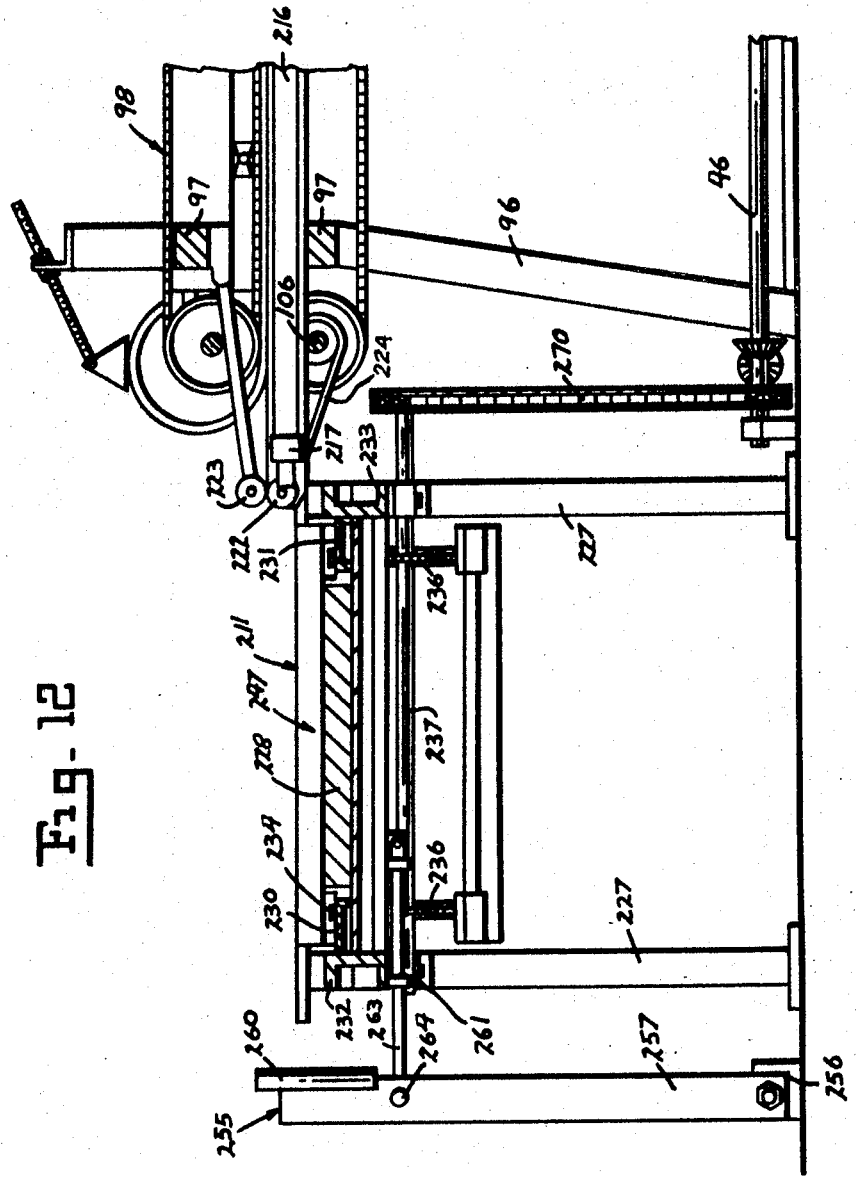

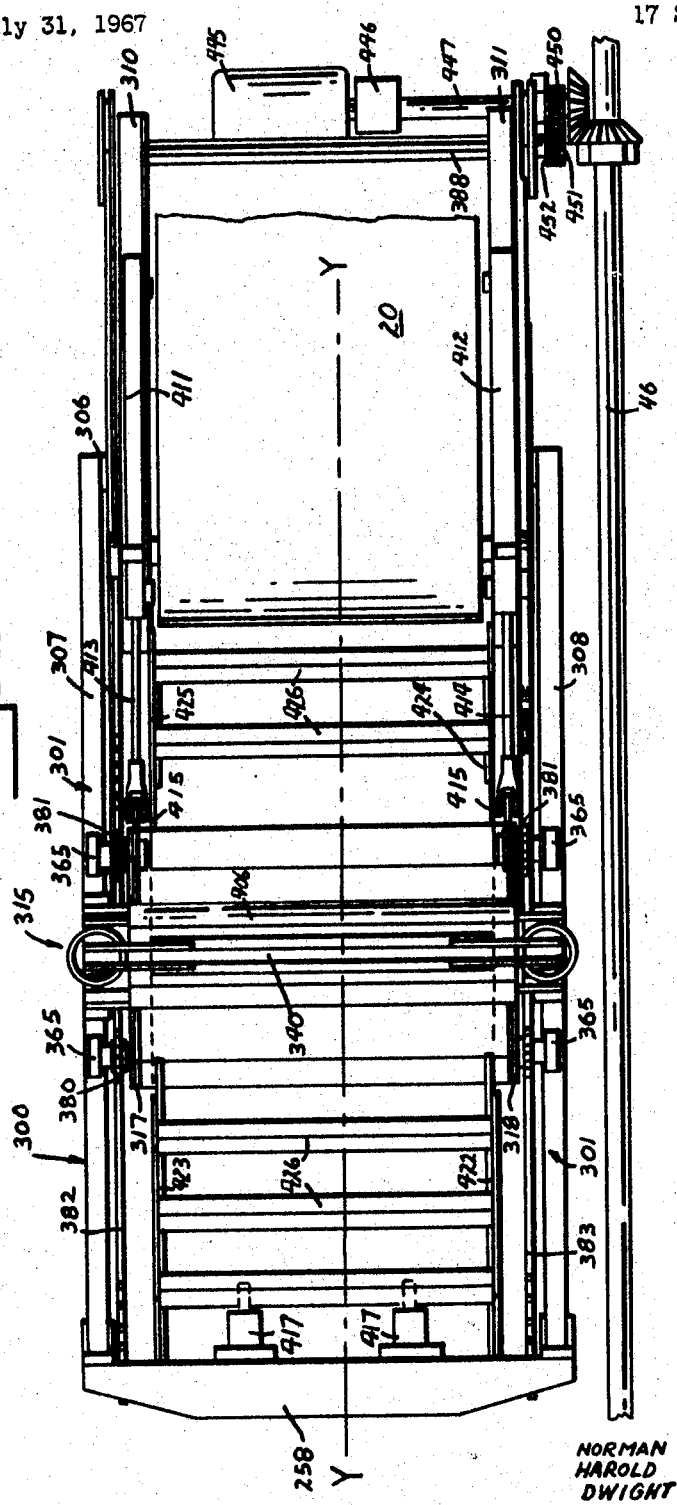

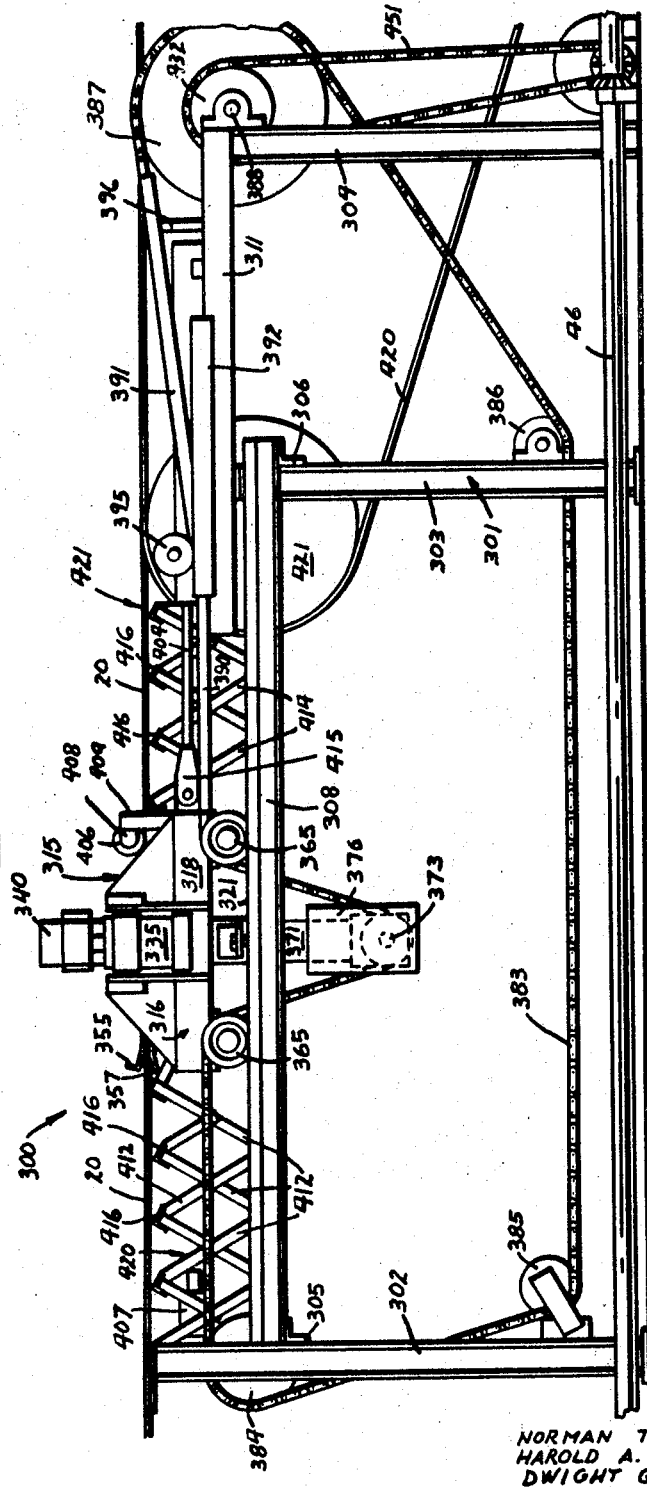

INVENTORS.
NORMAN THOMAS SHELTON
HAROLD A. KELLER
DWIGHT G. SEAY
BY
Wells & St. John
ATTYS.

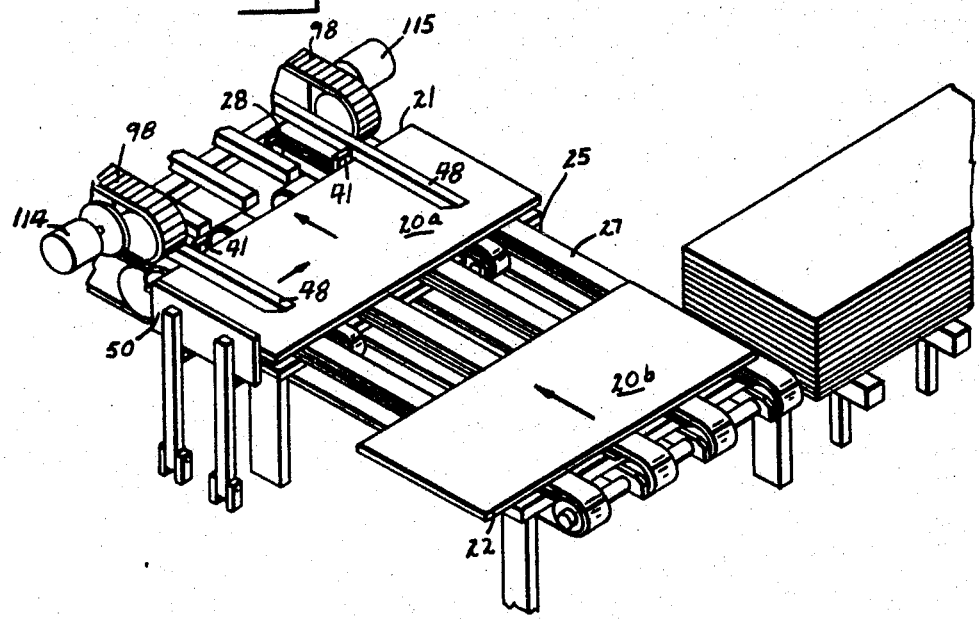
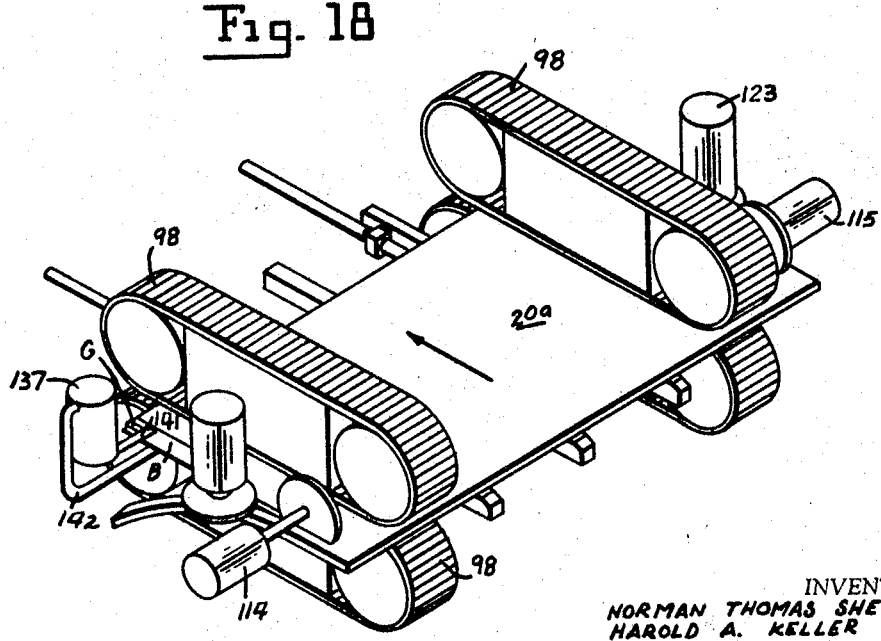

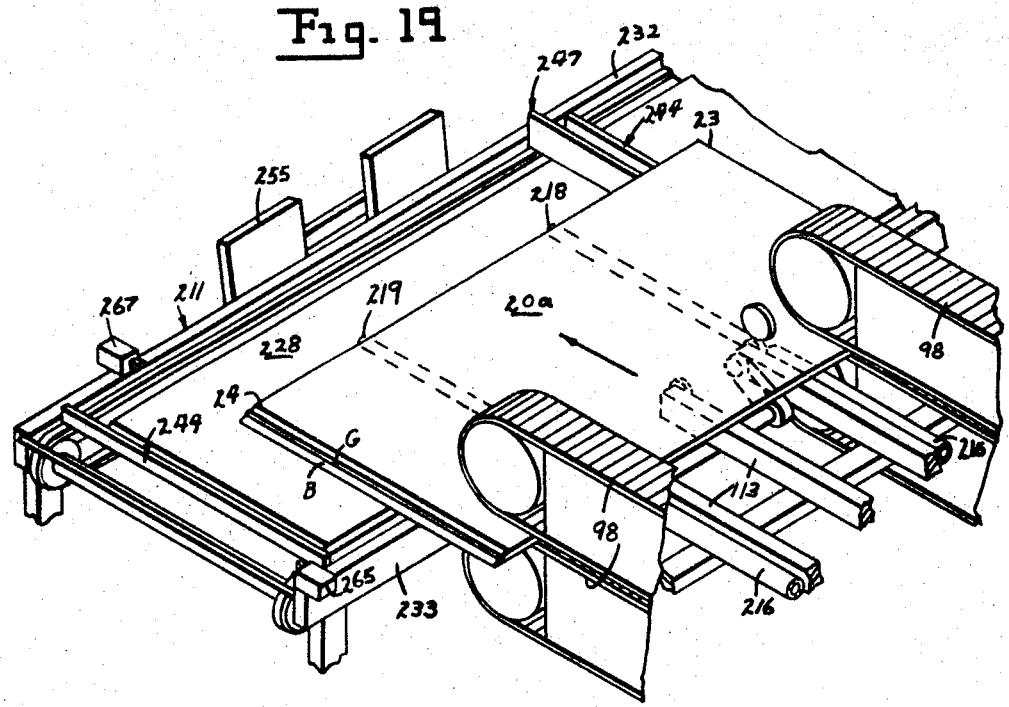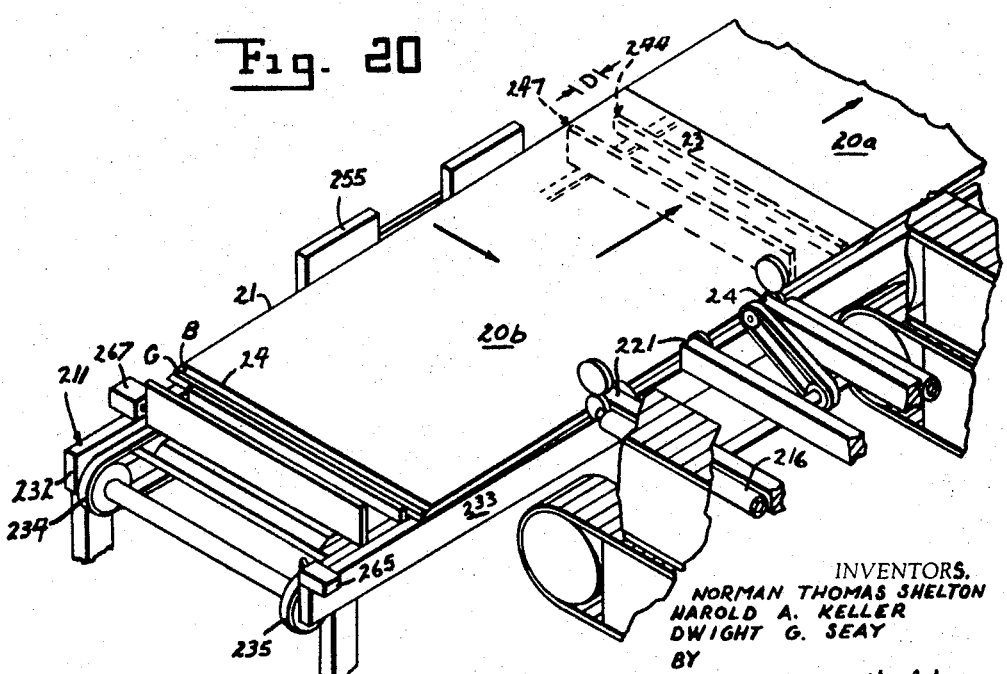

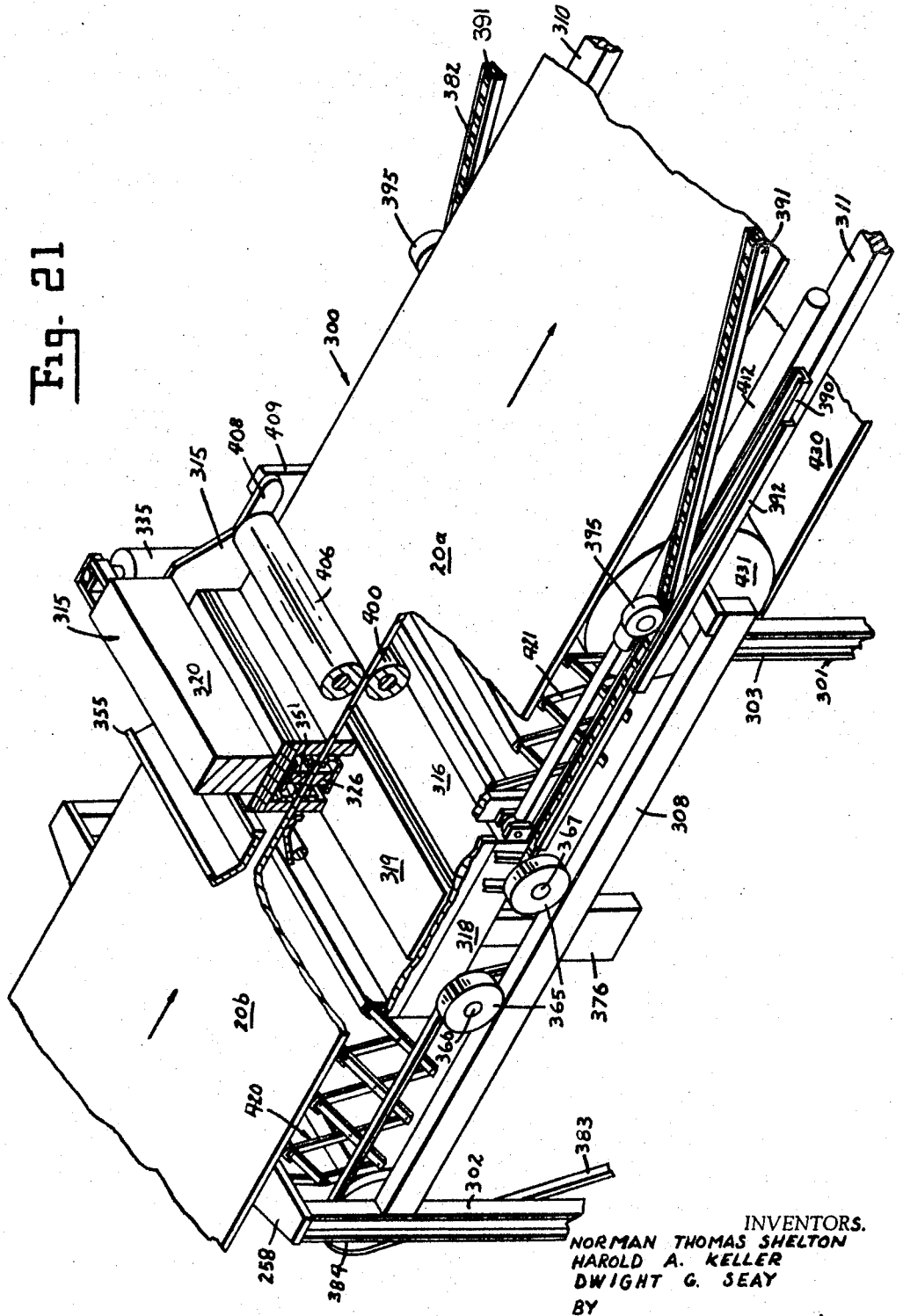

United States Patent Office 3,461,932
Patented Aug. 19, 1969

3,461,932
PROCESS FOR MANUFACTURING A CONTINUOUS VENEER STRIP
Norman Thomas Shelton, Lewiston, Idaho, and Harold A. Keller and Dwight G. Seay, Clarkston, Wash., assignors to Potlatch Forests, Inc., Lewiston, Idaho, a corporation of Delaware
Filed July 31, 1967, Ser. No. 657,185
Int. Cl. B27d 1/04, 3/04
U.S. Cl. 144—317                    20 Claims

ABSTRACT OF THE DISCLOSURE

The disclosure describes apparatus for performing the steps in manufacturing a continuous veneer strip. Initially the veneer sheets are positioned crosswise on a feed conveyor 25. The sheets are successively conveyed to a trimming, scarfing and glue applying apparatus 95. The apparatus 95 trims the ends of the sheets to form uniform length sheets having parallel end edges. A glue applicator deposits a bead of glue on one of the scarfed surfaces. A sheet transfer device 210 transfers and indexes the sheets over a feed conveyor 211. The device 210 drops the sheets lengthwise onto the feed conveyor in a timed relationship with moving pusher members 244 so that the forward end of each sheet overlaps the trailing end of the preceding sheet. The sheets are pushed forward by the pusher bars 244 onto a joint curing apparatus 300. The joint curing apparatus includes a reciprocal carriage with pressure platens for engaging the overlapping ends and curing the glue therebetween as the sheets are moving.

BACKGROUND OF THE INVENTION

This invention relates to a process for manufacturing a continuous veneer strip from veneer sheets.

In the customary process of manufacturing plywood, an uneven number of plies or veneer sheets are alternatively placed on one another and glued together with the grain of the odd numbered plies running the length of the plywood sheet and the grain of the even numbered plies running the width of the sheet. This alternative "laying up" of the veneer plies to form plywood gives the plywood its characteristic strength properties.

The dimensions of the plywood are dependent upon the size of the veneer sheets. Veneer sheets are produced by circumferential spiral peeling or by longitudinal slicing of the wood logs. The long grain dimension of the veneer is necessarily restricted to the length of the logs.

In the peeling operation the log is supported and rotated in a lathe apparatus. To obtain veneer sheets having even thicknesses the log must be rotated without any substantial deflection occurring in the log. The forces acting on the log tending to deflect the log are the weight of the log itself and the force of the peeling mechanism against the log. Accordingly, the longer the log the more susceptible it is to deflection. It has been found that it is uneconomical to peel dogs greater than 8 to 10 feet long. Thus, the long grain dimension of the veneer sheets that are used in forming the plywood is generally between 8 to 10 feet.

Plywood, as known in the industry today, is generally sold in sheets measuring 8 feet by 4 feet with the grain of the outer veneer plies running parallel to the larger dimension (lengthwise). For a premium price, plywood sheets having lengths of 7 feet, 9 feet, or 10 feet may be obtained.

The standard 4 x 8 plywood sheets, however, are not always the most desirable size as far as the user is concerned. Many plywood users have applications requiring plywood of greater length than the 7 to 10 foot lengths that are presently available to them. The users are required to purchase two or more sheets and cut and splice the sheets together to obtain the desired lengths. Often the portion of the plywood that is cut away can not be effectively utilized and is discarded. Furthermore, generally the spliced joint is not as strong as an integrated continuous strip. Much of the plywood is used for sheathing. If the particular wall application requires sheathing of greater than 8 to 10 feet, then two or more sheets are butted together forming undesirable horizontal seams that break the continuity of the grain. This is often structurally undesirable. Also, additional man hours are expended to fit the sheets together. This is a significant added cost to the home builder which is utimately borne by the homeowners.

Considerable research has been conducted in the plywood industry in attempting to develop a method for economically manufacturing a continuous length of veneer from standard veneer sheets that may be either subsequently cut into desired lengths or used in forming a continuous strip of plywood.

Since veneer sheets have a substantial length and width and are very thin, special care is required in its handling.

Generally herefore a strip of veneer was produced by first forming beveled surfaces on the ends of the veneer sheets (referred to as scarfing) and then manually aligning the succeeding sheets with a stationary preceding sheet in an overlapping manner. The abutting ends of the sheets are placed in a press to cure the glue to form a joint between the sheets.

The prior art includes an apparatus for joining scarfed veneer ends in which the preceding sheet is held stationary while the succeeding sheet is held stationary while the succeeding sheet is moved forward against alignment stops to accurately position the forward scarfed end of the succeeding sheet over the trailing scarfed end of the preceding sheet. The sheets are then independently gripped and transported to a stationary press where the sheets are stopped and aligned with the press. The press secures the ends together to form a joint between the sheets. The joined sheets are then transported to a stationay shearing device where the joined sheets are cut into desired lengths.

The length of the strip of veneer sheets that may be joined by such apparatus is substantially limited. Each time a sheet is to be added, the preceding sheets are stopped to permit the addition. This requires the acceleration and deacceleration of the joined sheets which necessitates very expensive and complicated equipment to perform. The longer the line of joined sheets the more difficult the problem becomes.

One of the principal objects of the invention is to provide a process for manufacturing a continuous veneer strip from veneer sheets that is simple, efficient and above all economical.

An additional object of this invention is to provide a process for making a continuous veneer strip in which the scarfed ends of the sheets are overlapped without having to stop the continuous strip.

A further object of this invention is to provide a process for making a continuous veneer strip from veneer sheets in which each sheet is aligned and moved in reference to its trailing scarfed end.

An additional object of this invention is to provide a method for making a continuous veneer strip that may be subsequently used in forming a continuous strip of plywood.

BRIEF DESCRIPTION OF THE DRAWINGS

An apparatus for performing the steps of the method invention is illustrated in the accompanying drawings, in which:

FIG. 1 is a schematic plan view of the basic apparatus components that may be used in performing the principal steps of the instant process;

FIG. 2 is a plan view of a feed conveyor for successively feeding veneer strips to a trimming, scarfing and glue applying apparatus;

FIG. 3 is a side elevation view of the feed conveyor;

FIG. 4 is a rear elevation view of the feed conveyor;

FIG. 5 is a plan view of the trimming, scarfing and glue applying apparatus;

FIG. 6 is a rear view of the trimming, scarfing and glue applying apparatus;

FIG. 7 is a schematic view taken from FIG. 6 showing one end of a veneer sheet being scarfed;

FIG. 8 is a schematic view taken from FIG. 6 showing the other end of the veneer sheet being scarfed;

FIG. 9 is a side elevation view of the trimming, scarfing and glue applying apparatus taken from the left in FIG. 6;

FIG. 10 is a plan view of an assembly feeder;

FIG. 11 is a side elevation view of the assembly feeder;

FIG. 12 is a cross-sectional view of the assembly feeder taken on line 12—12 in FIG. 10;

FIG. 13 is a plan view of a joint curing apparatus;

FIG. 14 is a side elevation view of the joint carrying apparatus;

FIG. 17 is a perspective schematic view showing a veneer sheet being centered and fed to the trimming and scarfing apparatus by the feed conveyor;

FIG. 18 is a perspective schematic view showing the edges of the veneer sheet being trimmed and scarfed. The view also shows the applying of a glue bead along one of the scarfed ends;

FIG. 19 is a perspective schematic view showing the scarfed veneer sheet being indexed onto the assembly feeder;

FIG. 20 is a schematic perspective view showing a veneer sheet with its leading edge overlapping the trailing end of the preceding sheet; and FIG. 21 is a perspective schematic view showing the overlapping edges of the veneer sheets being cured in a moving curing apparatus.

DESCRIPTION OF THE PREFERRED EMBODIMENT

General description

Figure 15:
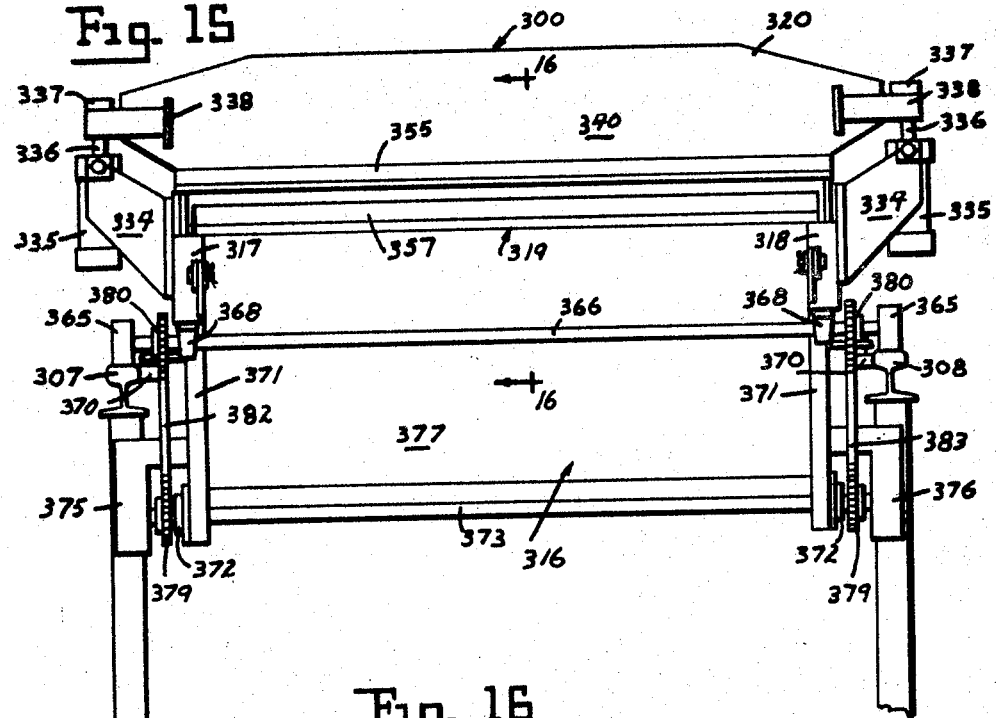
FIG. 15 is a front view of the joint curing apparatus.

There is shown schematically in FIG. 1 apparatus for performing the steps of the present invention for manufacturing a continuous veneer strip from veneer sheets 20. Each of the veneer sheets 20 is rectangular in shape with the grain of the veneer sheet running along the major dimension of the sheet. Each sheet has a side 21, a side 22, an end 23 and an end 24. A stack of veneer sheets 20 is positioned adjacent the assembling apparatus with the major dimension perpendicular to an X path. Initially the sheets are successively positioned on a feed conveyor that moves the sheets crosswise along the X path with the side 21 leading and the side 22 trailing. A transverse positioner is positioned parallel to the feeder conveyor for centering the sheets on the feed conveyor. The feed conveyor transports the sheets along the X path at approximately 300 feet per minute until the edge of the side 21 engages the side squaring lugs that are moving at approximately 60 feet per minute. The side squaring lugs align the sheet so that the edge of the side 21 is perpendicular to the path of movement. The side squaring lugs move the sheets crosswise into a scarfer conveyor system. As the sheets move along the scarfer conveyor, the ends 23 and 24 of each sheet are trimmed by trim saws to form uniform length sheets having parallel edges. The scarfer conveyor moves the sheets crosswise past scarfing saws that bevel the ends 23 and 24 of the sheets to form complementary parallel scarfed surfaces A and B. The scarf surface A is associated with the end 23 and faces down and the scarf surface B is associated with the end 24 and faces up. As the sheets move past the scarfing saws a glue applicator applies a bead of glue on the scarf surface B.

A sheet transfer apparatus receives the sheets from the scarfer conveyor and indexes the sheets over an assembly conveyor. The sheets are then lowered lengthwise in a timed relationship onto the assembly feeder into a path Y so that the forward end 23 of each sheet overlaps the trailing end 24 of the preceding sheet by a prescribed distance. The Y path is perpendicular to the X path. A trailing end pusher bar on the assembly feeder engages the trailing end of each sheet to push the sheet forward. A transverse support bar immediately behind the pusher bar supports the forward end of each sheet above the trailing end of the preceding sheet to prevent smearing of the glue. As the sheets progress forward along the Y path, a veneer stripper strips the sheets from the trailing end pusher bar. The veneer stripper also moves the trailing end of each sheet upward into engagement with the overlapping forward end of the succeeding sheet. A reciprocably mounted joint curing apparatus grasps the joint and moves forward with the moving sheets to apply pressure and heat to the joint to cure the glue to form a strong integrated continuous strip. A belt conveyor then conveys the continuous strip along the Y path for further processing.

It should be noted that the continuous strip is not stopped while a succeeding sheet is joined to the strip. Each veneer sheet 20 is initially aligned with respect to the edge of the side 21 whereupon the end edges are trimmed to form parallel edges that are perpendicular to the side edge 21. When the veneer sheets are placed on the assembly feeder the sheets are overlapped in relationship to the trailing edge of the sheets.

Feed conveyor

The feed conveyor 25 is shown in detail in FIGS. 2–4. Specifically, the feed conveyor 25 has a base frame 26 with two overlapping conveyor systems—a belt conveyor system 27 and a chain conveyor system 28. The belt conveyor system 27 has four parallel endless belts 30 that are aligned along the X path. Each of the belts 30 is movably supported between a pulley on a drive shaft 31 and a pulley on an idler shaft 32. The drive shaft 31 is rotated by a chain 31a that is driven by a constant speed motor 33 mounted on the frame 26. A belt speed of approximately 300 feet per minute has been found to be particularly effective.

The chain conveyor system 28 comprises two parallel endless chains 34 that are movably mounted between the outer belts 30 and extend forward into the scarfing apparatus to overlap with the scarfer conveyor. Each of the chains 34 is suspended between a chain sprocket 43 on a drive shaft 35 and a chain sprocket on the idler shaft 36. A tension sprocket is mounted on a shaft 37. The shaft 37 is rotatably mounted at the end of a pivot arm 38. A spring 42 interconnects the other end of the pivot arm 38 and the frame 26 to provide a constant tension on the chains 34.

Each of the chains 34 has several evenly spaced lugs 41 that are affixed to the chains. Each of the lugs 41 has an upright leg portion 42 that projects into the path of the veneer sheets as they are being moved on the belts 30. The upright legs 42 receive the side edge 21 of the sheets to align the sheets perpendicular to their path of movement. The chains 34 are moved at a substantially slower speed than the belts 30 so that each sheet moves against a corresponding set of lugs 41 to properly align the sheet on the feed conveyor. When the sheet engages the lugs 41 the speed of each sheet is reduced with the sheet slipping on the belt conveyor 27.

The drive sprocket 43 is moved by a drive chain 44 that extends to a sprocket 45 mounted on a segment of a system drive shaft 46 that is rotatably mounted near the floor level. The segment extends to a right angle gear box 47 to interconnect with a further segment of the system drive shaft 46.

Two elongated guides 48 are mounted overlying the outer belts 30 to guide the ends of the sheets to prevent the upward deflection of the sheets. The guides extend longitudinally from the start of the chain conveyor 28 to the scarfer conveyor.

A transverse positioner 50 is mounted on the left side of the feed conveyor 25 parallel to the X path for centering each sheet on the feed conveyor while the side edge 21 of each sheet is in engagement with a respective set of chain lugs 41. The transverse positioner 50 has two upright frame members 51 that are pivotably mounted to shoes 52 that are affixed to the floor. A guide panel 53 is mounted between the two upright frame members 51 and extends parallel to the feed conveyor for engaging the edge of the end 24 of each sheet. The panel 53 has an upright face that engages the edge of the end 24. The transverse positioner is pivoted to and from the feed conveyor by a fluid operated piston-cylinder actuator 55 that is mounted to the frame 26. A connecting rod 56 of the actuator 55 extends to one of the upright frame members 51. The transverse positioner 50 is timed to be operated in conjunction with the position of the lugs 41 to center the sheets on the chain conveyor 28 to properly align the sheets to the trimming, scarfing and glue applying apparatus 95.

Trimming, scarfing and glue applying apparatus

The feed conveyor 25 successively feeds the sheets at evenly spaced intervals to the trimming, scrafing and glue applying apparatus 95. The apparatus 95 has a base frame 96 with tubular cross frame members 97. The apparatus 95 has a double conveyor system 98 movably mounted thereon for moving the sheets successively crosswise past various work stations. The double conveyor system 98 (FIG. 6) has an upper chain set 100 and a lower chain set 101 for receiving the sheets therebetween and moving the sheets across the apparatus 95. The upper chain set 100 has two parallel endless chain treads 102 that move in a clockwise direction as viewed in FIG. 9. The lower chain set 101 has two parallel endless chain treads 103 that are vertically aligned with the upper chain treads. The treads 103 move in a counter-clockwise direction. The upper endless chain treads 102 are suspended between drive sprockets on a drive shaft 104 and idler sprockets on an idler shafts 105. The lower endless chain treads 103 are suspended between drive sprockets on a drive shaft 106 and idler sprockets on an idler shaft 109. The inner flights of the lower endless chain treads 103 are supported by a race on the frame 96. The inner flights of the upper endless chain treads 102 are supported by fluid-operated pressure races 107 (FIG. 9). The upper drive shaft 104 is rotated by a variable speed motor 108 through a drive train 110. The lower drive shaft 106 is rotated by a variable speed motor 111 through a drive train 112. The chain treads 102 and 103 grip the sheets near the ends of the sheets to move the sheets forward along the path X maintaining the body of the sheets in a prescribed horizontal plane. The center portion of the sheets are supported on longitudinal support members 113 that are positioned between the conveyor treads.

Trim saws 114 and 115 (FIG. 5) are mounted on the frame 96 adjacent the front of the frame for trimming the ends 23 and 24 of each sheet to form parallel end edges that are perpendicular to the edge of the side 21. The trim saws 114 and 115 cut each sheet to a desired length. The trim saws 114 and 115 have vertical circular blades 116 and 117 respectively for cutting the end edges. Each trim saws 114 and 115 is slidably mounted in horizontal ways 118 that are affixed to the frame 96. Electric motors 120 and 121 drive the trim saws 114 and 115 respectively.

Scrafing saws 122 and 123 are located on opposite sides of the frame 96 and outside the conveyor treads 102 and 103 for cutting beveled end surfaces on the ends 23 and 24. Each of the scarfing saws 122 and 123 is movably mounted in conventional ways 124 that are affixed to the frame 96 to permit vertical, horizontal and angular adjustment of the scrafing saws. Scarfing saws 122 and 123 have saws blades 125 and 126 respectively for cutting the ends 23 and 24 to form the scarfed surfaces. It should be noted that the circular horizontal blade 125 is vertically positioned slightly below the plane of the sheet 20 in a near horizontal plane. The circular saw blade 126 is vertically positioned slightly above the level of the veneer sheet in a near horizontal plane. Electric motors 127 and 128 drive the scarfing saws 122 and 123 respectively.

As may be particularly seen in FIGS. 6–9 angularly adjustable anvils 130 and 131 are positioned in the path of the sheet ends for deflecting the ends into the path of the horizontal circular saw blades 125 and 126 respectively. The anvil 130 is mounted to a housing 132 in a depending position to deflect the end 23 downwardly into the path of the circular blade 125. The anvil 131 is mounted to a housing 133 in an upward projection to deflect the sheet end 24 into the path of the horizontal saw blade 126. The saw blade 125 forms a downwardly facing scarfed surface A terminating in a thin edge. The horizontal scarfing blade 126 forms an upwardly facing beveled surface B on the end 24 terminating in a thin edge of approximately $\frac{1}{32}$ of an inch or less Generally the scarfed surfaces have an approximate 7 to 1 slope. For $\frac{1}{6}$ inch thick veneer sheets, the projected width of the scarfed surfaces A and B is 1⅛ inches.

A glue applicator 137 is mounted on the frame 96 for applying a bead G of glue along the scarfed surfaces B as may be particularly seen in FIG. 18. Specifically, the glue applicator 137 includes a glue container 138 that is mounted on the frame 96 adjacent the scarfing saw 123 by a bracket 140. As may be seen in FIGS. 5, 6 and 17 a spout 141 extends from the glue container over to a position immediately over the scarfed surface B. A return line 142 is positioned below the spout 141 for catching the glue that is not applied to the scarfed surface B.

Sheet transfer device

A sheet transfer and indexing device 210 (FIGS. 10 and 12) is mounted on the frame 96 for receiving the sheets that are discharged from the conveyor system 98 and indexing the sheets onto the assembly feeder 211. The assembly feeder 211 is positioned perpendicular to the path X for moving the sheets lengthwise along the path Y. Specifically, the sheet transferring and indexing device 210 includes fluid operated piston-cylinder actuators 215 and 216 that are mounted to the outer horizontal support member 113 respectively. Each of the actuators 215 and 216 is quite long and extends a substantial length of the horizontal support members 113. Each of the actuators 215 and 216 is mounted to a support member 113 by brackets 217. The actuators 215 and 216 have piston rods or transfer members 218 and 219 respectively that are slidably mounted thereon for projecting over the assembly feeder 211 to receive the veneer sheets as they are fed from the scarfing conveyor. Stop plates 221 are mounted on the rear ends of the horizontal support members 113 for providing a stripping surface to strip the sheets from the piston rods 218 and 219 when the rods are retracted. Drive rollers 222 are mounted at the rear ends of the horizontal support members 113 for facilitating the movement of the sheets from the support members 113. Pressure wheels 223 are mounted above the drive wheel to hold the sheets against the drive rollers. The drive rollers 222 are driven by chains 224 from the shaft 106. After the sheets leave the scarfer conveyor 98, the rollers 222 move the sheets onto the extended piston rods 218 and 219. The rollers 222 also prevent the return of the sheets when the rods 218 and 219 are retracted.

Assembly feeder

The assembly feeder 211 (FIG. 10–12) comprises a base frame 227 that is aligned along the selected path Y. The base frame 227 includes an elongated platform 228 for supporting the central portion of the sheets as they are released from the indexing device 210. The elongated platform is positioned so that it has a slight forward slope as may be particularly seen from the side elevation view in FIG. 11. The ends of the elongated platform are inclined. Longitudinal channel irons or chain races 230 and 231 are mounted to the sides of a platform 228 slightly below the level of the platform so that they do not support the released sheets. Side rails 232 and 233 are mounted to the frame on the outside of the channels 230 and 231 for supporting the sides of the sheet as they are released. The upper surface of the side rails 232 and 233 are in the same plane as the upper surface of the platform 228. Like the platform 228 the side rails have a similar forward slope.

An endless conveyor system is mounted on the frame 227 for moving the released sheets lengthwise along the slected path Y. The endless conveyor includes two parallel conveyor chains 234 and 235 that are mounted between the platform 228 and the side rails 232 and 233 respectively with the upper flights thereof slidably supported on the longitudinal channels 230 and 231. The endless conveyor chains are mounted between drive sprockets 236 that are affixed to a drive shaft 237 and idler sprockes 238 that are affixed to an idler shaft 240.

The pusher members 244 are mounted to the chains 234 at uniform intervals. The distance between the intervals is less than the lentgh of the sheets by prescribed distance "D" that is slightly greater than the width of one of the scarfed surfaces A or B. For ⅙ inch thick veneer sheets, the distance "D" is closed to 1⅓ inches. The pusher members 244 include brackets or lugs 245 that are secured to the chains 234 and 235 at the uniform intervals. Bars 246 are supported on the top of the brackets 245 and extend transversely between the chains 234 and 235 for structural integrity. As the pusher member moves in the upper flight of the conveyor the lugs 245 slide over the chain races 230 and 231 for engaging the trailing edge of the end 24 to push the sheets forward along the path Y.

Support members 247 are mounted to the chains 234 and 235 immediately behind the pusher members 244 for supporting the forward end 23 of the sheets above the preceding pusher members 244. Each support member 247 has a height sufficient to elevate the forward end of a sheet to maintain the sheet substantially horizontal as the sheet moves forward on the assembly feeder in a somewhat descending manner (FIG. 11). Each of the support members 247 includes brackets or lugs 248 that are secured to the chains. Each support member 247 includes a bar 250 that extends between the chains 234 and 235 for supporting the forward end 23 of the sheets.

A stripping plate or veneer stripper 258 is mounted transversely across the rear of the frame 227 for stripping the sheets from the assembly feeder. The stripper plate 252 is positioned on the frame 227 spaced from the drive shaft 237 a distance sufficient to permit the support members 247 to round the forward end of the conveyor flight without engaging the stripper plate 252. The stripper plate 252 receives the forward edge of the sheets as the support member 247 rounds the forward corner of the upper flight.

A lateral or transverse positioners 255 is mounted adjacent the base frame 227 parallel to the path Y for centering the sheets on the assembly feeder. The lateral positioner includes shoes 256 that are secured to the floor. Interconnected uprights 257 are mounted to the shoes 256 for pivotal movement to and from the assembly feeder. Face plates 260 are mounted to the interconnected uprights 257 for engaging the edge of the side 21 of the sheets. A fluid operated piston-cylinder actuator 261 is connected to the base frame 227. The piston rod 263 of the actuator 261 extends toward the lateral positioner and is connected to one of the uprights 257 by a bracket 264.

A limit switch 265 is adjustably mounted on the base frame 227 to be actuated by the pusher members 244 as the pusher members approach the upper flight of the conveyor. The limit switch 265 energizes a solenoid valve that controls the actuators 215 and 216. When a pusher member 244 approaches the upper flight of the conveyor, it actuates the limit switch 265. The actuation of the limit switch 265 causes the piston rods or transfer members 218 and 219 to retract to strip the sheets from the piston rods by moving the sheets against the stop plates 221. Each stripped sheet falls onto the assembly feeder 211 with the trailing end 24 immediately forward of the pusher member that actuated the switch 265. A limit switch 267 is mounted on the frame 227 forward of the limit switch 265 to be actuated by the pusher members 244 for operating the transverse positioner 255 as the pusher member 244 moves forward. Both of the limit switches 265 and 267 are adjustably mounted on the frame so that if the speed of the conveyor system is increased or decreased the limit switches may be positioned accordingly.

The conveyor system for the assembly feeder is driven by the system drive shaft 46. The drive shaft 46 after it leaves the feed conveyor extends underneath the trimming, scarfing and glue applying apparatus to a right angle gear box 268. A drive sprocket 269 is fixed to the system shaft 46 for moving a drive chain 270. The drive chain 270 extends to a chain sprocket 271 that is affixed to the drive shaft 237 on the assembly feeder.

The assembly feeder pushes the sheets along the Y path in the overlapped relationship over the stripper plate 258 and onto a scarf joint curing apparatus 300.

Scarf joint curing apparatus

The scarf joint curing apparatus 300 includes a base frame 301 that comprises uprights 302, 303 and 304 (FIGS. 13 and 14). Frame brackets 305 and 306 are transversely affixed to the uprights 302 and 303 respectively. Parallel longitudinal crane rails 307 and 308 extend between the brackets 305 and 306 for supporting a reciprocable carriage 315. Parallel longitudinal channel irons 310 and 311 are mounted between the uprights 303 and 304 at an elevation above the crane rails 307 and 308.

The carriage 315 includes a carriage frame 316 that has spaced side channels 317 and 318 that are parallel to one another. The carriage frame 316 also includes a fixed bottom platen 319 that is mounted between the side channels 317. An upper top platen 320 is movably mounted immediately above the bottom platen 319 for grasping the overlapped scarfed surfaces A and B to form a scarfed joint between adjacent veneer sheets.

The bottom platen 319 (FIG. 16) includes a transverse horizontal beam 321. An insulation layer 322 is mounted on the beam 321 for insulating the heat generated by the platen elements from being communicated to the rest of the carriage structure. A backing plate 323 is mounted on the insulation layer 322 for supporting the curing elements of the bottom platen. The curing elements of the bottom platen include two spaced cold platen members 324 and 325 that are mounted parallel to each other on the backing plate 323 and which extend substantially across the carriage frame. Intermediate and spaced from the cold platen elements is a hot platen member 326 that is heated to a temperature of approximately 400° F. for curing the glue between the scarfed surfaces. Two spring biased transverse strippers 327 and 328 are mounted on opposite sides of the hot platen member for stripping the sheets from the hot element. Each stripper includes studs 333 that are mounted upright on the base plate 323. Springs 331 are positioned about the studs 333. Channel caps 332 are secured to the top of the spring 331 for engaging the sheets spaced from the overlapping joint.

Upwardly and outwardly extending brackets 334 are mounted to the side channels 317 and 318 for supporting the trunions of hydraulic piston cylinders 335. The cylinders 335 move the upper platen 320 up and down. Connecting rods 336 of the cylinder extend upward to connecting blocks 337 affixed to the upper platen by brackets 338.

The upper platen 320 includes an upper platen beam 340 that extends transversely over the sheets. Self-centering washer bearings 341 (FIG. 16) are affixed at intervals along the base of the platen beam 340 for supporting the curing elements of the upper platen. The self-centering washers 341 permit angular movement of the upper curing elements to adjust to the contour of the joint. A plate 343 is attached to the self-centering washer bearings 341 by bolts 342. Each of the self-centering washer bearings 341 includes a stationary race 344 and a slidably mounted race 345 that is complementarily contoured to slide on the stationary race 344. An insulation strip 346 is positioned below the plate 343 to prevent the heat that is generated from the curing elements from being communicated to the carriage structure. A backing plate 347 is mounted below the insulation strip for supporting the curing elements of the upper platen. The curing elements of the upper platen include two parallel cold platen members 348 and 350 that are vertically aligned with the corresponding cold platen members 324 and 325 respectively. A hot platen member 351 is positioned intermediate the cold platen members 348 and 350 in vertical alignment with the bottom hot member 326 for engaging the joint area to cure the glue and form a secured joint. Stripper members 352 and 353, similar to stripper members 327 and 328, are positioned intermediate the cold platen members 348 and 350 and the hot platen member 351 for stripping the joint from the hot platen member 351 when the upper platen is elevated at the completion of the curing cycle.

Figure 16:
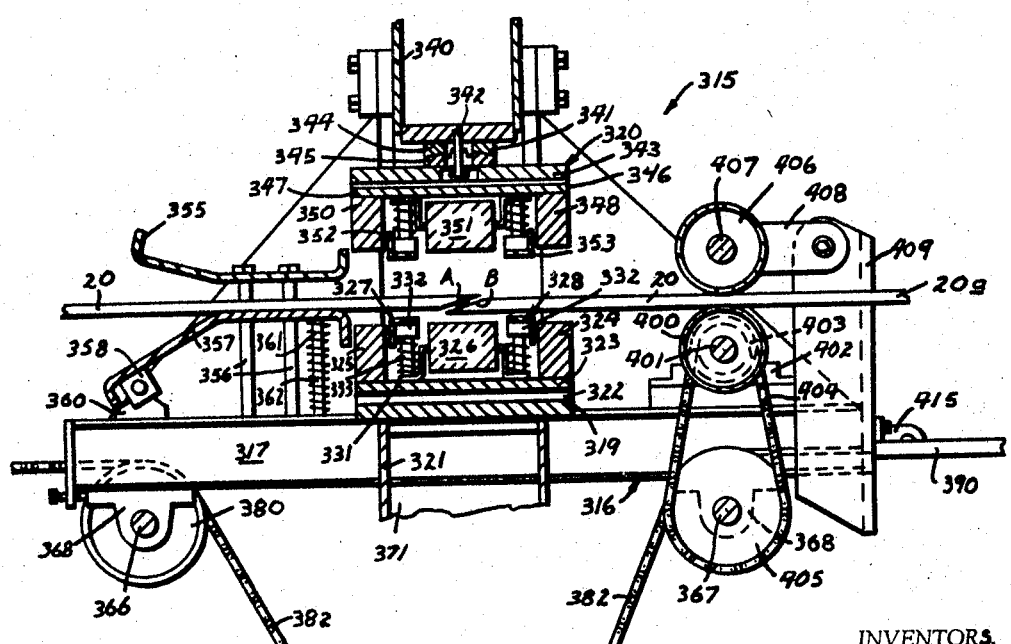
FIG. 16 is a fragmentary cross-sectional view taken on line 16—16 in FIG. 15.

As may be particularly seen from the cross sectional view in FIG. 16 throat members are positioned immediately upstream from the platen members for guiding the sheets as they move to the platen members. The throat member includes a stationary throat member or deflector 355 that extends transversely to the sheets immediately above the path of the sheets. The stationary throat member 355 is supported by rods 356 that project upward from the side channels 317 and 318. A resiliently biased throat member or deflector 357 is positioned immediately below the stationary throat member 355 for supporting the sheets. The throat member 357 is pivotally mounted to a shaft 358. The shaft 358 is mounted in bearings 360 that are attached to the side channels 317 and 318. The back of the deflector 357 is supported on springs 362 that surround rods 361 that project upward from the channels 317 and 318.

The carriage frame 316 is supported on the crane rails 307 and 308 by wheels 365. The forward set of wheels 365 are free wheeling on a front axle 366. The rear wheels are free wheeling on a rear axle 367. The axles 366 and 367 are rotatably mounted on bearing blocks 368 that are affixed to the underside of the side channels 317 and 318. Guide rollers 370 extend from both sides of the side channels 317 and 318 for engagement with the inside of the rails 307 and 308 to laterally position the carriage. Brackets 371 are affixed to the underside of the side channels 317 and 318 and project downwardly for rigidly supporting pillow blocks 372. The pillow blocks support a rotatable shaft 373 that extends transversely across the carriage 315. Electrically operated brakes 375 and 376 are rigidly mounted to the brackets 371 and surround respective ends of the shaft 373. When actuated the brakes 375 and 376 stop the rotation of the shaft 373. A metal apron 377 extends along the front and back of the brackets 371 for providing structural integrity.

Two chain sprockets 379 are keyed to the shaft 373 intermediate the pillow blocks 372 and the electrically operated brakes 375 and 376. Two chain sprockets 380 (FIG. 13) are keyed on the front axle 366 intermediate the pillow blocks 368 and the front wheels 365 in lateral alignment with the sprockets 379. Two chain sprockets 381 (FIG. 13) are keyed on the rear axle 367 in lateral alignment with the sprockets 379 and 380.

The joint curing carriage 315 is driven in the same direction as the flow of the sheets by parallel endless drive chains 382 and 383 in engagement with the chain sprockets 379, 380 and 381. Each of the drive chains 382 and 383 also engages an idler sprocket 384 and a tension adjusting sprocket 385 (FIG. 14) that are rotatably mounted on the uprights 302. Idler sprockets 386 are mounted near the base of the uprights 303 for receiving the drive chains 382 and 383. The drive chains 382 and 383 are moved by drive sprockets 387 that are affixed to a shaft 388 that is rotatably mounted in bearings on the uprights 304.

To make sure that there is no slack in the chains 382 and 383 between the carriage and drive sprockets 387, support races 390 and 391 (FIGS. 13 and 14) are provided to support the flights. Support races 390 are attached to the rear of the carriage 315 and extend rearward beneath the chains 382 and 383 for sliding engagement on channel bearings 392. The channel bearings are mounted on brackets 393 that are attached to the frame channels 310 and 311. Immediately above the channel bearings, idler sprockets 395 are rotatably mounted to change the direction of the chains.

The support races 391 are fixed at an incline and extend from the idler sprockets 395 to the drive sprockets 387. The support races are supported on brackets 396 attached to the frame channels 310 and 311.

To facilitate the movement of the sheets along the Y path, a drive roller 400 (FIG. 16) is mounted immediately behind the lower platen 319. The drive roller 400 is secured to a shaft 401 that is rotatably mounted in bearing pillow blocks 402 mounted on the upper surface of the channels 317 and 318. Sprockets 403 are affixed to the ends of the shaft 401 in lateral alignment with sprockets 405 that are keyed on the axle 367. Since the sprockets 381 and 405 are keyed with the axle 367, the rotation of one is transmitted to the other. Chain 404 extends between the sprockets 403 and 405 for transmitting rotational movement therebetween. As may be seen in FIG. 16 a pressure roller 406 is affixed to a rotatable shaft 407 that is mounted to the end of brackets 408. The brackets 408 are pivotally mounted to frame extensions 409 near the rear of the carriage frame 316.

The joint curing apparatus has a separate reverse drive mechanism that moves the carriage 315 forward to a position adjacent the assembly apparatus 211. The reverse drive means includes two spaced parallel pneumatic cylinders 411 and 412 (FIGS. 13 and 14) that are mounted on the channels 310 and 311 respectively. The pneumatic cylinders 411 and 412 have piston rods 413 and 414 respectively, that extend forward and are connected through connecting brackets 415 to the rear of the carriage frame. The pneumatic cylinders 411 and 412 are continuously pressurized so that when the electrically operated brakes 375 and 376 are released the pneumatic cylinders will move the carriage to the forward position.

Dash pots 417 are mounted to the upright frame members 302 for stopping the carriage as it is moved forward by the pneumatic cylinders 411 and 412.

Expandible support means are connected between the uprights 302 and 303 and the carriage frame 316 to support the veneer sheets as the carriage moves back and forth on the crane rails. The expandable support means includes an expandable front frame 420 and expandable rear frame 421. The expandible front frame 420 includes two sets of levers 422 and 423 (FIG. 13). In each set, the levers are interconnected at their midpoints and ends to form expandable parallelogram structures. The expandable rear frame structure 421 also includes two sets of levers 424 and 425.

Contoured sheet metal members 426 are mounted between the lever sets for supporting the veneer sheets as the carriage moves forward and back on the crane rails.

A belt system is mounted partly to the frame 301 for receiving the sheets from the joint curing apparatus 300. The belt system includes a belt 430 that is mounted on an idler roller 431 that is rotatably mounted in bearings on the uprights 303.

The drive systems for the feed conveyor 25, the assembly feeder 211, the joint curing apparatus 300, and the belt system are all synchronized through the shaft 46 which is driven by a variable speed motor 445. A speed reduction unit 446 is connected to the motor 445. A shaft 447 extends from the reduction unit to a right angle gear box 448. The gear box 448 is connected to the system drive shaft 46. One segment of the shaft 46 extends downstream to the drive roller (not shown) for the belt 430. A sprocket 450 is mounted on the shaft 447 for rotating the curing apparatus drive shaft 388 through chain 451 and sprocket 432.

As an alternative drive system, the feed conveyor, the assembly feeder 211, the joint curing apparatus and the belt system may all be driven by separate variable speed motors that are synchronized together by a main control mechanism that is capable of uniformly increasing or decreasing the speeds of the motors as desired for the particular application.

OPERATION

For purpose of illustration, the operation of the apparatus for performing the steps of this invention will be described with reference to veneer sheets 20a and 20b. Initially, (FIG. 17) the sheets are successively positioned crosswise on the belt conveyor 27 of the feed conveyor 25 with the sides 21 extending forward and the sides 22 extending rearward. The belt conveyor 27 moves the sheet 20a forward at the speed of the moving belts until the edge of the side 21 engages the lugs 41 that are affixed to the moving chain conveyor 28. The lugs 41 align the edge of the side 21 normal to the movement of the sheets. Since the chain conveyor 28 is moving considerably slower than the belt conveyor 27, the belt continues to frictionally bias the sheet 20a against the lugs 41 to maintain the transverse alignment of the sheet 20a. The transverse positioner 50 centers the sheet 20a on the chain conveyor 28 before it is fed to the conveyor system 98 of the trimming scarfing and glue applying apparatus 95.

The chain conveyor 28 extends into the trimming, scarfing and gluing apparatus 95, to positively present the sheets to the conveyor system 98. As the sheet 20a is moved forward by the conveying system 98, the ends 23 and 24 of the sheet 20a are trimmed by the trim saws 114 and 115 (FIG. 18) to form a uniform length sheet having parallel end edges that are normal to the edges of the side 21.

The scarfing saws 122 and 123 form beveled or scarfed ends on the sheet 20a. The scarfing saw 122 forms a scarfed surface A on end 23 that faces downwardly. The scarfing saw 123 forms a scarf surface B on the end 24 that faces up. As the sheet 20a continues to move, a bead G of glue is deposited on the scarf surface B as it moves past the glue applicator 137.

As shown in FIG. 19, as the sheet 20a moves from the conveying system 98 it is discharged by the drive rollers 222 onto the extending rods or transfer members 218 and 219 with the side 22 immediately in front of the support members 113.

When a pusher member 244 moves from the lower flight to the upper flight on the assembly conveyor feeder 211, it engages the limit switch 265 (FIG. 19 and 20). The limit switch 265 operates a solenoid to pressurize the actuators 215 and 216 to retract the piston rods 218 and 219. When the rods 218 and 219 retract, the edge of the side 22 moves against the stop plates 221 mounted on the ends of the horizontal support members 113 to strip the sheet 20a from the piston rods 218 and 219. With the piston rods 218 and 219 fully retracted, the sheet 20a descends onto the assembly feeder 211 with the main body of the sheet being supported on the elongated platform 228 and the sides of the sheet 20a being supported on the side rails 232 and 233 respectively. The trailing edge of the end 24 is immediately forward of the pusher member 244. The forward end 23 of the sheet 20a is supported on the support member 247 so that the forward end extends over the preceding pusher member 244 to overlap the trailing end of the preceding sheet.

The pusher member 244 moves forward into abutting engagement with the trailing edge of end 24 to move the sheet forward at the same rate as the movement of the conveyor chains 234 and 235. The pusher member 244 squares the sheet on the assembly feeder. When the pusher member 24 engages the trailing edge of the sheet 20a, the forward end 23 of the sheet extends over the preceding pusher member 244 and the preceding sheet by the predetermined distance D. Since the distance D is slightly greater than the width of the scarf surfaces A or B, the scarf surface A of the sheet 20a overlaps the scarf surface B of the preceding sheet. The sheet 20a and the preceding sheet are pushed forward at the same rate in the overlapped relationship. When the pusher member 244 actuates the limit switch 267, the transverse positioner 255 moves against the edge of the side 21 to transversely center the sheets on the assembly feeder 211.

The sheet 20b is processed in the same manner so that it will be indexed and positioned lengthwise on the assembly feeder 211 with its forward end 23 overlapping the trailing end 24 of the sheet 20a.

The pusher bars push the sheets 20a and 20b forward at the same rate. As the sheet 20a moves over the stripping plate 252 the trailing end 24 flexes upward to engage the scarfed surface B with the overlapped scarfed surface A of the sheet 20b.

The sheets continue to move onto the joint curing apparatus 300. The carriage is initially in the upstream position for receiving the overlapped ends of the sheets. When the overlapped surfaces A and B are vertically aligned with the hot platen members 326 and 351, the electrically operated brakes 375 and 376 are actuated to prevent further rotation of the shaft 373.

Since the chain sprockets are keyed to the shaft 373, the carriage becomes locked to the moving drive chains 382 and 383 thereby causing the carriage to move in the direction of the moving veneer sheets. The hydraulic cylinders 335 are then operated to lower the upper platen 320 to press the overlapped ends of the sheets between the joint curing elements. The cold platen members 324, 325, 348 and 350 engage the sheets spaced from the scarfed surfaces to hold the sheets in relationship to each other so that there is no movement therebetween while the glue is being cured and to limit the downward movement of the upper platen. The hot platen members, which are heated to a temperature of approximately 400°, engage the sheets in alignment with the scarfing surfaces A and B to cure the glue between the scarf surfaces to form a scarfed joint. The platens apply a curing pressure of approximately 200 p.s.i. to the joint area.

When the upper platen 320 is lowered to engage the ends of the sheets 20a and 20b, the sheets are then moved forward in relationship to the speed of the drive chains 382 and 383. As a special feature of this process, the chains 382 and 383 are moved at a slightly faster speed than the sheets are being pushed by the pusher members 244 so that the sheets are gradually pulled from the pusher members. The drive sprocket arrangement to the joint curing drive shaft 388 is designed so that the chains 382 and 383 move forward a distance of $\frac{1}{32}$ of an inch further than the pusher members 244 in a given sheet length. Thus, when the pusher members 244 approach the forward end of the upper flight, the sheets have been pulled away from the pusher members. This feature prevents the pusher members from damaging the thin edges of the trailing ends of the sheets as the pusher members round the sprockets on the shaft 237.

Since the scarfed ends are overlapped approximately 1⅓ inches (over registered) when they are initially moved by the pusher member 244, the ⅟₃₂ of an inch differential speed does not adversely effect the overlapped relationship of the sheets.

As the carriage approaches the end of its forward travel, the hydraulic cylinders 335 are operated to lift the upper platen to release the sheets. The spring biased strippers 327, 328, 352 and 353 strip the forward joint from the hot platen to prevent sticking.

Since the pneumatic cylinders 411 and 412 are continually pressurized as soon as the electrically operated brakes 375 and 376 are released the pneumatic cylinders move the carriage forward to its upstream position to receive the succeeding overlapped ends. As the carriage moves upstream the sprockets 379, 380 and 381 are rotated at a speed that is related to the movement of the chains 382 and 383 plus the forward movement of the carriage. The rotation of the sprockets 381 is transmitted to the drive roller 400 to provide a positive drive means for moving the strip forward as the carriage is moving backward (FIG. 16). Thus, it can be said that the curing machine has a strip drive that moves the strip forward independently of the direction of movement of the carriage.

From the carriage the strip moves onto the belt 430 to be conveyed downstream for further processing. It should be particularly noted that the strip is not stopped while an additional sheet is being added. Thus, it is not necessary to have complicated equipment for stopping and aligning the strip with the to be added sheet.

It should be understood that the above described apparatus for performing the steps of the instant invention are merely illustrative, because numerous other apparatus and machines may be developed by those skilled in the art to perform the steps of this invention. Only the following claims are intended to define this invention:

What is claimed is:

1. In a process of manufacturing a continuous veneer strip from veneer sheets having parallel scarfed ends, the steps of:
    (a) positioning the sheets lengthwise in a selective path at a uniform rate; and
    (b) continuously moving the sheets lengthwise along the selected path at a speed related to the uniform positioning rate and the length of the sheets so that the forward scarfed end of each sheet overlaps the trailing scarfed end of the preceding sheet.

2. In the process as defined in claim 1, the sheets are moved along the selected path in relation to the trailing edge of each sheet.

3. In the process as defined in claim 2, each sheet is positioned in the selected path with the forward scarfed end facing downward and the trailing scarfed end facing upward.

4. The process as defined in claim 1 including, the additional steps of:
    (a) applying adhesive material to one scarfed end of each sheet;
    (b) clamping the overlapping ends together as the sheets are continuously moved along the selected path; and
    (c) curing the adhesive material to form an integrated continuous veneer strip.

5. In the process as defined in claim 1, the positioning step includes successively moving the sheets into position in the selected path at a uniform rate.

6. The process as defined in claim 1, including the additional prior steps of:

(a) indexing the sheets lengthwise over the selected path; and
    (b) successively lowering the sheets into position in the selected path.

7. In the process as defined in claim 6 the indexing step includes the moving of the sheets crosswise successively over the selected path at the uniform rate.

8. In the process as defined in claim 1, the sheets are aligned and moved along the selected path by pushing the trailing edge of each sheet.

9. The process as defined in claim 1, including the additional step of bringing the overlapped ends into abutting engagement as the sheets are moved along the selected path.

10. A process of manufacturing a continuous veneer strip from veneer sheets, comprising the steps of:
    (a) positioning and centering the sheets along a first path with one edge of each sheet being positioned transverse to the first path;
    (b) moving the sheets at spaced intervals along the first path, and during said movement;
        (1) trimming the edges adjacent said transverse edge of each sheet to form parallel prepared edges; and
        (2) scarfing the ends of each sheet having the prepared edges;
    (c) transferring the sheets to a second path at a uniform rate;
    (d) moving the sheets along the second path with the prepared edges transverse to the second path at a rate related to the transfer rate so that the scarfed ends of the adjacent sheets overlap to form a continuous strip.

11. The process as defined in claim 10 further comprising the step of applying adhesive to one scarfed end of each sheet.

12. The process as defined in claim 11 further comprising the steps of:
    (a) clamping the overlapping scarfed ends together; and
    (b) curing the adhesive to form an integrated continuous strip having scarfed joints between adjacent sheets.

13. The process as defined in claim 10 wherein the sheets are positioned along the first path normal to the grain of the veneer.

14. The process as defined in claim 10 wherein the ends of the sheets are complementarily scarfed so that the forward scarfed end faces downwardly and the trailing scarfed end faces upwardly.

15. The process as defined in claim 10 wherein the second path is perpendicular to the first path, and wherein further the sheets are transferred from the first path to the second path by successively moving the sheets over the second path and then lowering the sheets onto a conveying means that moves the sheets along the second path with the forward scarfed end of each sheet overlying the trailing scarfed end of the preceding sheet.

16. The process as defined in claim 11 wherein each sheet is initially pushed along the second path at a speed related to the transfer rate and the length of the sheet so that the forward end of each sheet overlaps the complementary trailing scarfed edge of a preceding sheet.

17. The process as defined in claim 16 further comprising the additional steps of:
    (a) clamping the overlapped scarfed ends together;
    (b) advancing the sheets along the second path at a slightly greater speed to render the pushing ineffective;
    (c) curing the adhesive of the clamped ends to form an integrated continuous strip having scarf joints between the sheets.

18. A continuous process of manufacturing a continuous veneer strip from separate rectangular veneer sheets by transporting the sheets initially along a first path and then along a second path that is perpendicular to the first path, said process comprising the steps of:
- (a) successively positioning the sheets crosswise along the first path with a side edge normal to the first path;
- (b) centering the sheets along the first path;
- (c) serially moving the sheets along the first path, and during said movement:
  - (1) trimming the ends of the sheets to form uniform length sheets having parallel end edges;
  - (2) complementarily scarfing the parallel ends of the sheets; and
  - (3) applying adhesive material to one of the scarfed ends of each sheet;
- (d) positioning the sheets lengthwise over the second path;
- (e) successively lowering the sheets into the second path at a uniform intervals;
- (f) successively pushing the sheets along the second path at a speed related to the uniform intervals and the length of the sheets so that the succeeding sheet is lowered with the forward scarfed end overlapping the trailing scarfed end of the sheet being pushed;
- (g) clamping the overlapping ends together;
- (h) advancing the clamped ends along the second path; and
- (i) curing the adhesive material of the advancing clamped ends to form an integrated continuous veneer strip having scarfed joints between the veneer sheets.

19. The process as defined in claim 18 wherein the adhesive curing is accomplished by applying heat and pressure to the overlapping ends.

20. The process as defined in claim 18 wherein the clamped ends are advanced along the second path at a speed slightly greater than the pushing rate to render the pushing ineffective.

References Cited

UNITED STATES PATENTS

| | | | |
|---|---|---|---|
| 2,306,151 | 12/1942 | Bailey | 144—323 |
| 2,544,133 | 3/1951 | Carlson | 156—546 |
| 3,377,223 | 4/1968 | Clausen et al. | 144—315 |
| 3,388,020 | 6/1968 | Gates | 156—266 |

GERALD A. DOST, Primary Examiner

U.S. Cl. X.R.

144—321; 156—159